Patented June 15, 1954

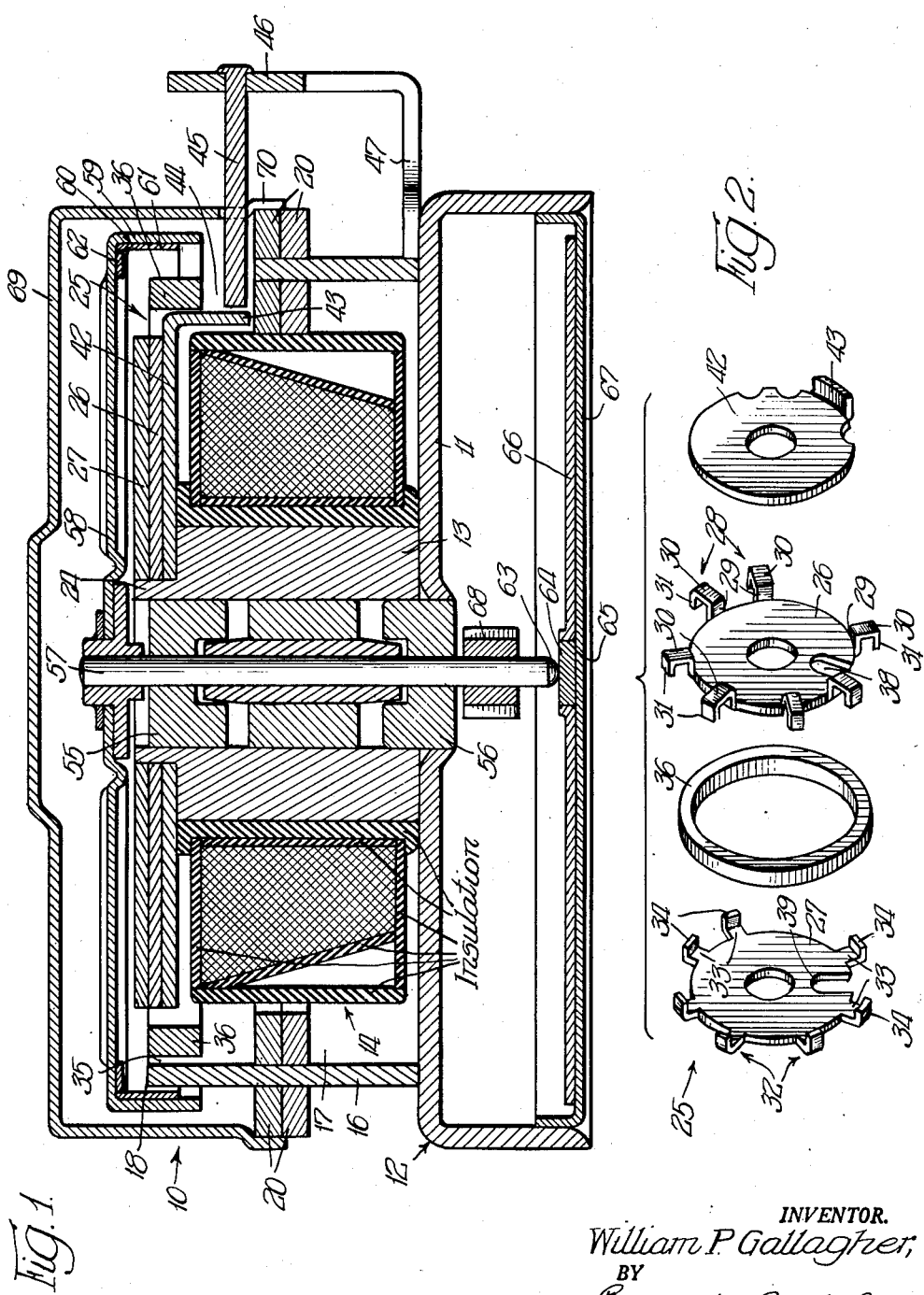

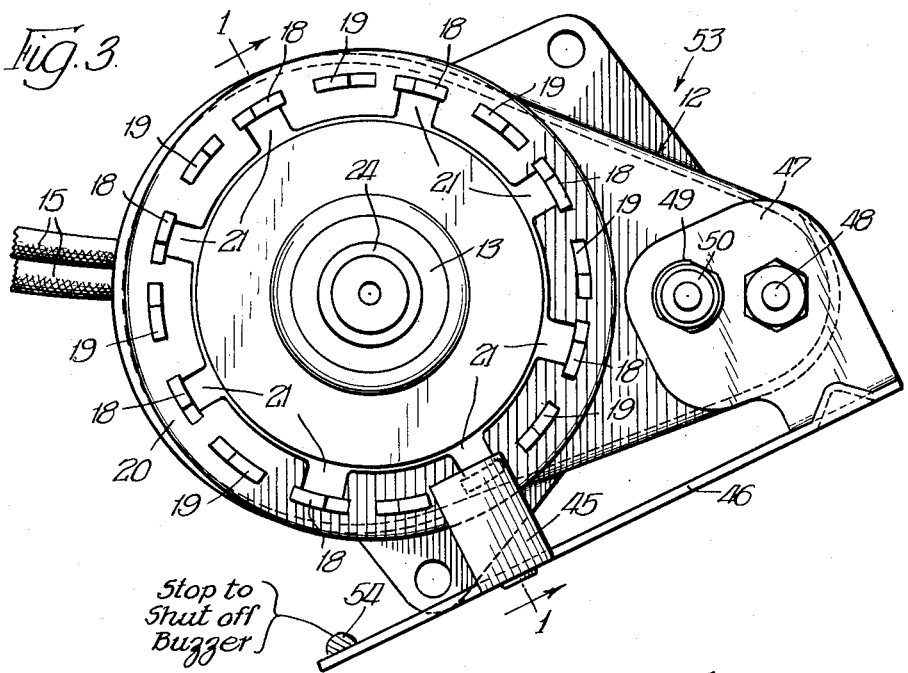
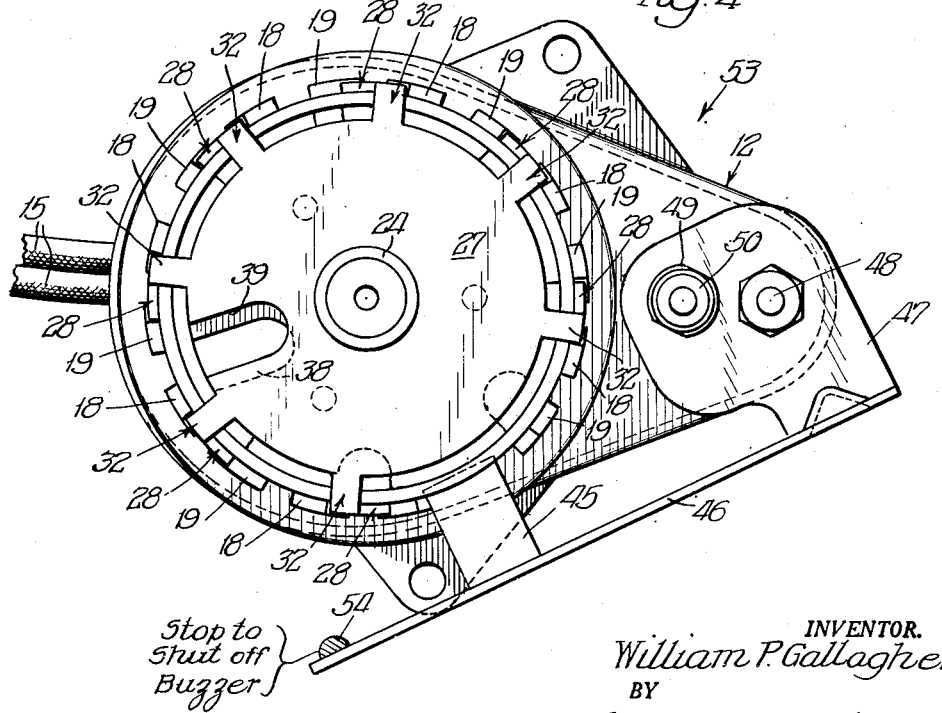

2,681,444

UNITED STATES PATENT OFFICE 2,681,444

COMBINED ELECTRIC MOTOR AND BUZZER CONSTRUCTION

William P. Gallagher, Chicago, Ill., assignor to International Register Company, Chicago, Ill., a corporation of Illinois Application December 14, 1949, Serial No. 132,959

10 Claims. (Cl. 340—393)

This invention relates, generally, to electric motor constructions, and it has particular relation to small shaded pole synchronous motors provided with a built-in alarm device such as a buzzer. The present invention is illustrated in combination with a motor construction of the type shown in copending application Serial No. 132,958, filed December 14, 1949, now Patent No. 2,615,069, issued October 21, 1952, and assigned to the assignee of this application.

Among the objects of this invention are: To employ the magnetic field generated by the operating winding of a motor of the shaded pole type for operating a signaling device, such as a buzzer; to accomplish this using a motor having a basket type field construction; to employ a substantial portion of the motor magnetic circuit in common with the buzzer magnetic circuit; to mount the vibrating part of the buzzer at one end of the core of the magnetic circuit on a magnetic plate which forms a part of the gear case and motor mounting bracket; to provide a space extending radially from the core and winding of the field structure into which the hammer of the vibrating buzzer arm can project to cooperate with a field piece projecting from the other end of the core; and to provide this space by omitting a set of pairs of pole tips from the field structure at the ends of the core.

Other objects of this invention will, in part, be obvious and in part appear hereinafter.

This invention is disclosed in the embodiment thereof shown in the accompanying drawings, and it comprises the features of construction, combination of elements and arrangement of parts which will be exemplified in the construction hereinafter set forth and the scope of the application of which will be indicated in the appended claims.

For a more complete understanding of the nature and scope of this invention, reference can be had to the following detailed description, taken together with the accompanying drawings, in which:

Figure 1 is a vertical sectional view through a motor and buzzer construction of the present invention, the scale being four times actual size and the view being taken generally along the line 1—1 of Figure 3;

Figure 2 is a perspective view of the parts making up the shaded field and buzzer plate assembly, the parts being shown in disassembled relation and at full scale;

Figure 3 is a top plan view of the stator construction, the shaded field and buzzer plate assembly being omitted, the showing being at double scale; and Figure 4 is a view, similar to Figure 3, but showing the shaded field and buzzer plate assembly in position.

Referring now particularly to Figure 1 of the drawings, it will be observed that the reference character 10 designates, generally, a combined synchronous shaded-pole motor and buzzer construction in which the present invention is embodied. It includes a magnetic plate 11 which forms the back and sides of a gear case that is indicated, generally, at 12. The magnetic plate 11 extends radially from an annular magnetic core 13 to which it may be secured as by welding. Surrounding the annular magnetic core 13 is a winding 14 which may be connected by conductors 15, Figures 3 and 4, to a suitable source of alternating current such as a 60 cycle 120 volt source.

Returning to Figure 1 it will be noted that a magnetic field ring 16 extends upwardly from the upper side of the magnetic plate 11 and that a space 17 is provided between it and the periphery of the winding 14. At the upper edge of the magnetic field ring 16 unshaded and shaded pole tips 18 and 19 are provided and, they extend substantially to the upper end of the annular magnetic core 13. The pole tips 18 and 19 are illustrated more clearly in Figure 3 where shading rings 20 are illustrated having radial slots 21 adjacent each of the unshaded pole tips 18. Since the shading rings 20, which may be formed of copper or aluminum, completely surround the pole tips 19, the flux therefrom lags the flux from the pole tips 18 when the winding 14 is energized with alternating current as will be understood readily.

The annular magnetic core 13 has a reduced diameter end section 24 for receiving a shaded field and buzzer plate assembly that is shown, generally, at 25. The parts making up the assembly 25 are shown more clearly in Figure 2 of the drawings. It will be noted that the assembly 25 includes an inner magnetic field plate 26 and an outer magnetic field plate 27. The inner magnetic field plate 26 has pole tips 28 extending generally radially therefrom. Each of the pole tips 28 includes an axial section 29, which extends from the inner magnetic field plate 26 over the winding 14 toward the magnetic plate 11. Also each of the pole tips 28 includes a radial section 30 and at the outer end thereof an axial end section 31. The outer magnetic field plate 27 has pole tips 32 extending generally radially therefrom. Each pole tip 32 includes a radial section 33 and an axial end section 34. The axial end sections 31 extend in the same direction as the axial section 29 and in a direction opposite to that in which the axial end sections 31 extend. The pole tips 28 and 32 together define an annular space 35, Figure 1, in which a shading ring 36 is positioned. It will be understood that the shading ring 36 causes the flux from the pole tips 32 to lag the flux from the pole tips 28 when the winding 14 is energized with alternating current. The plates 26 and 27 may be provided with radial slots 38 and 39 to reduce eddy current loss.

It will be understood that the magnetic field ring 16 with the pole tips 18 and 19 thereof together with the shading rings 20 in conjunction with the field plates 26 and 27, their pole tips 28 and 32 and the shading ring 36 provides a basket type of field construction which, when the winding 14 is energized with alternating current, acts to produce a shifting magnetic field in a narrow annular band around the interfitting and axially coextensive portions of the pole tips 18, 19, 28, and 32. It is the principal object of the present invention to incorporate a buzzer construction in this basket type of field construction so that use can be made of the winding 14 and a considerable portion of the associated magnetic circuit for operating the buzzer.

For this purpose the assembly 25 also includes a buzzer plate 42 of magnetic material which is juxtaposed to the inner magnetic field plate 26 as shown more clearly in Figure 1. The buzzer plate 42 has a pole tip 43 extending therefrom axially of the annular magnetic core 13 toward the magnetic plate 11. If desired, the buzzer plate 42 can be omitted and the pole tip 43 formed integrally with the inner magnetic field plate 26. However, for manufacturing and assembly purposes, it may be preferable to employ a separate buzzer plate 42 as shown.

The pole tip 43 from the buzzer plate 42 extends transversely of a space 44 which extends radially with respect to the core 13 and winding 14 between the shading rings 20 and 36. This is shown more clearly in Figure 1. The radial space 44 is provided by omitting one set of pole tips 18 and 19 on the magnetic field ring 16 and one set of pole tips 28 and 32 on the inner and outer magnetic field plates 26 and 27. This construction is illustrated more clearly in Figure 4 of the drawings.

The radial space 44 is provided to accommodate a hammer 45 which is made of magnetic material and is in the form of a flat plate. The hammer 45 is arranged to vibrate with respect to the pole tip 43 on energization of the winding 14 with alternating current. For this purpose the hammer 45 is mounted on and carried by a resilient buzzer arm 46 of magnetic material which is generally flat and which extends parallel to the annular magnetic core 13. The buzzer arm 46 has an anchor portion 47 which extends at right angles thereto for mounting flat against the upper side of the magnetic plate 11 so as to complete the magnetic circuit around the winding 14. The anchor portion 47 may be held in engagement with the upper surface of the magnetic plate 11 by a bolt 48. It may be provided with an opening 49 for receiving a bearing sleeve 50 which construction assists in locating the anchor portion 47 and the buzzer arm 46 in proper operative position.

The assembly thus far described constitutes the stator construction which is indicated, generally, at 53 and forms a subassembly in the manufacture of the combined synchronous shaded pole motor and buzzer construction 10. This is shown in Figure 4. Also, as shown there, a stop 54 is arranged to cooperate with the outer end of the resilient buzzer arm 46 for preventing the hammer 45 from vibrating except when it is desired that such vibration take place to give the required signal. It will be understood that the stop 54 may be operated manually or that it may be operated automatically by a timing device at the end of a predetermined interval to release the buzzer arm 46 so that it and the hammer 45 can be vibrated, the inner end of the hammer 45 striking the outer surface of the pole tip 43, so as to give the desired signal at the proper time.

Referring again to Figure 1 of the drawings, it will be noted that bearings 55 and 56 are provided at the ends of the annular magnetic core 13. A rotor shaft 57 is journaled in the bearings 55 and 56 and it carries at the upper end a non-magnetic rotor 58 which may be formed of aluminum. The rotor 58 has an annular rim 59 for carrying a rotor ring, shown generally at 60, which has a generally L-shaped cross section. One arm 61 of the rotor ring 60 is coextensive with the annular rim 59 while the other arm 62 extends radially inwardly therefrom. This construction is provided in order to have an end thrust of predetermined force on the rotor shaft 57. This end thrust is resisted at the lower tapered end 63 of the shaft 57 by a thrust bearing 64 in the form of a nylon disc. The disc or thrust bearing 64 may be mounted in an opening 65 in a plate 66 which is carried by a cover plate 67. The cover plate 67 interfits with the gear case 12 and serves to close the same.

At the lower end of the rotor shaft 57 a pinion 68 may be fastened. It will be understood that the pinion 68 can be employed to drive a gear train in accordance with conventional practice for reducing the speed of the rotor shaft 57 as may be desired. Such gear train can be mounted within the gear case 12 as will be understood readily.

A cover 69 may be provided over the upper end of the construction 10 as shown in Figure 1. Its lower rim may be telescoped over the upper shading ring 20. The cover 69 has a slot 70 for accommodating the hammer 45.

Since certain changes can be made in the foregoing construction and different embodiments of the invention can be made without departing from the spirit and scope thereof, it is intended that all matter shown in the accompanying drawings and described hereinbefore shall be interpreted as illustrative and not in a limiting sense.

What is claimed as new is:

1. A stator for a combined electric motor and buzzer construction comprising, in combination, a magnetic core, a winding on said core, a basket type field structure including alternate shaded and unshaded pole members extending from the ends of said core and surrounding said winding and providing a shifting magnetic field along an annular path coaxial with said core, a magnetic buzzer arm constituting an extension from one end of said core, and a magnetic hammer carried by said buzzer arm and extending radially through said basket type field structure parallel to the plane of said annular path toward the other end of said core whereby, when said winding is energized with alternating current, said hammer is vibrated.

2. A combined electric motor and buzzer construction comprising, in combination, a magnetic core, a winding on said core, a basket type field structure including alternate shaded and unshaded pole members extending from the ends of said core and surrounding said winding and providing a shifting magnetic field along an annular path coaxial with said core, a shaft rotatably mounted on said core, a rotor carried by said shaft in said path whereby said rotor is caused to rotate, a magnetic buzzer arm constituting an extension from one end of said core, and a magnetic hammer carried by said buzzer arm and extending radially through said basket type field structure parallel to the plane of rotation of said rotor toward the other end of said core whereby, when said winding is energized with alternating current, said hammer is vibrated.

3. A combined electric motor and buzzer construction comprising, in combination, a magnetic core, a winding on said core, a basket type field structure including alternate shaded and unshaded pole members extending from the ends of said core and surrounding said winding and providing a shifting magnetic field along an annular path coaxial with said core when said winding is energized by alternating current, one set of adjacent pairs of pole tips from said field structure being omitted whereby a space extending radially outwardly from said core is provided, a buzzer plate on one end of said core having a pole tip overlying said winding and extending transversely of said radial space, a resilient buzzer arm of magnetic material connected to the other end of and extending parallel to and spaced from said core, and a hammer of magnetic material carried by said buzzer arm and extending into said radial space parallel to the plane of said shifting magnetic field so that its inner end is adjacent to said pole tip on said buzzer plate whereby on energization of said winding said hammer is vibrated with respect to said pole tip.

4. A stator for a combined electric motor and buzzer construction comprising, in combination, a magnetic core, a winding on said core for energization by alternating current, a magnetic field ring extending from said plate, axially coextensive with said core, spaced from said winding, and having spaced pole tips extending to the other end of said core; a shading ring carried by said field ring with portions extending radially outwardly and inwardly thereof into the space around said winding and surrounding alternate ones of said pole tips, inner and outer juxtaposed field plates extending radially from said other end of said core and having pole tips extending therefrom in pairs coextensive with adjacent pairs of pole tips of said field ring, a shading ring for the pole tips of the outer field plate, one set of adjacent pairs of pole tips from said field ring and field plates being omitted whereby a space extending radially outwardly from said core between said shading rings is provided, a buzzer plate on said other end of said core juxtaposed to the inner field plate and having a pole tip overlying said winding and extending toward said magnetic plate transversely of said radial space, a resilient buzzer arm of magnetic material having an anchor portion at one end flat against and secured to said magnetic plate and the remaining portion extending at right angles thereto parallel to and spaced from said core, and a hammer of magnetic material carried by said buzzer arm and extending into said radial space parallel to the plane of the shifting magnetic field around said pole tips so that its inner end is adjacent to said pole tip on said buzzer plate whereby when said winding is energized said hammer is vibrated with respect to said pole tip.

5. A stator for a combined electric motor and buzzer construction comprising, in combination, a magnetic core, a winding on said core for energization by alternating current, a magnetic plate extending radially from one end of said core; a magnetic field ring extending from said plate, axially coextensive with said core, spaced from said winding, and having spaced pole tips extending to the other end of said core; a shading ring carried by said field ring with portions extending radially outwardly and inwardly thereof into the space around said winding and surrounding alternate ones of said pole tips, inner and outer juxtaposed field plates extending radially from said other end of said core and having pole tips extending radially therefrom in pairs with their outer extending in opposite axial directions between and coextensive with adjacent pairs of pole tips of said field ring, the pole tips from the inner field plate extending axially therefrom toward said magnetic plate whereby the radially outwardly extending portions thereof are axially spaced from the radially outwardly extending portions of the pole tips of the outer field plate and together define an annular space axially coextensive with said core, a shading ring in said annular space, one set of adjacent pairs of pole tips from said field ring and field plates being omitted whereby a space extending radially outwardly from said core between said shading rings is provided, a buzzer plate on said other end of said core juxtaposed to said inner field plate and having a pole tip overlying said winding and extending toward said magnetic plate transversely of said radial space, a resilient buzzer arm of magnetic material having an anchor portion at one end flat against and secured to said magnetic plate and the remaining portion extending at right angles thereto parallel to and spaced from said core, and a hammer of magnetic material carried by said buzzer arm and extending into said radial space parallel to the plane of the shifting magnetic field around said pole tips so that its inner end is adjacent to said pole tip on said buzzer plate whereby when said winding is energized said hammer is vibrated with respect to said pole tip.

6. A combined electric motor and buzzer construction comprising, in combination, a magnetic core, a winding on said core, a basket type field structure including alternate shaded and unshaded pole members extending from the ends of said core and surrounding said winding and providing a shifting magnetic field along an annular path coaxial with said core when said winding is energized by alternating current, one set of adjacent pairs of pole tips from said field structure being omitted whereby a space extending radially outwardly from said core is provided, a shaft rotatably mounted on said magnetic core, a rotor carried by said shaft including a rotor ring of magnetic material extending in to the shifting magnetic field and rotated thereby, a buzzer plate on one end of said core having a pole tip overlying said winding and extending transersely of said radial space, a resilient buzzer arm of magnetic material connected to the other end of and extending parallel to and spaced from said core, and a hammer of magnetic material carried by said buzzer arm and extending into said radial space parallel to the plane of rotation of said rotor so that its inner end is adjacent to said pole tip on said buzzer plate whereby when said winding is energized said hammer is vibrated with respect to said pole tip.

7. A combined electric motor and buzzer construction comprising, in combination, a magnetic core, a winding on said core, a magnetic plate extending radially from one end of said core; a magnetic field ring extending from said plate, axially coextensive with said core, spaced from said winding, and having spaced pole tips extending to the other end of said core; a shading ring carried by said field ring with portions extending radially outwardly and inwardly thereof into the space around said winding and surrounding alternate ones of said pole tips, inner and outer juxtaposed field plates extending radially from said other end of said core and having pole tips extending therefrom in pairs coextensive with adjacent pairs of pole tips of said field ring, a shading ring for the pole tips of the outer field plate, one set of adjacent pairs of pole tips from said field ring and field plates being omitted whereby a space extending radially outwardly from said core between said shading rings is provided, a shaft rotatably mounted on said magnetic core, a rotor carried by said shaft including a rotor ring of magnetic material extending into the shifting magnetic field around said pole tips and rotated thereby on energization of said winding by alternating current, a buzzer plate on said other end of said core juxtaposed to the inner field plate and having a pole tip overlying said winding and extending toward said magnetic plate transverely of said radial space, a resilient buzzer arm of magnetic material having an anchor portion at one end flat against and secured to said magnetic plate and the remaining portion extending at right angles thereto parallel to and spaced from said core, and a hammer of magnetic material carried by said buzzer arm and extending into said radial space parallel to the plane of rotation of said rotor so that its inner end is adjacent to said pole tip on said buzzer plate whereby when said winding is energized said hammer is vibrated with respect to said pole tip.

8. A combined electric motor and buzzer construction comprising, in combination, a magnetic core, a winding on said core, a magnetic plate extending radially from one end of said core; a magnetic field ring extending from said plate, axially coextensive with said core, spaced from said winding, and having spaced pole tips extending to the other end of said core; a shading ring carried by said field ring with portions extending radially outwardly and inwardly thereof into the space around said winding and surround alternate ones of said pole tips, inner and outer juxtaposed field plates extending radially from said other end of said core and having pole tips extending radially therefrom in pairs with their outer ends extending in opposite axial directions between and coextensive with adjacent pairs of pole tips of said field ring, the pole tips from the inner field plate extending axially therefrom toward said magnetic plate whereby the radially outwardly extending portions thereof are axially spaced from the radially outwardly extending portions of the pole tips of the outer field plate and together define an annular space axially coextensive with said core, a shading ring in said annular space, one set of adjacent pairs of pole tips from said field ring and field plates being omitted whereby a space extending radially outwardly from said core between said shading rings is provided, a shaft rotatably mounted on said magnetic core, a rotor carried by said shaft including a rotor ring of magnetic material extending into the shifting magnetic field around said pole tips and rotated thereby on energization of said winding by alternating current, a buzzer plate on said other end of said core juxtaposed to said inner field plate and having a pole tip overlying said winding and extending toward said magnetic plate transversely of said radial space, a resilient buzzer arm of magnetic material having an anchor portion at one end flat against and secured to said magnetic plate and the remaining portion extending at right angles thereto parallel to and spaced from said core, and a hammer of magnetic material carried by said buzzer arm and extending into said radial space parallel to the plane of rotation of said rotor so that its inner end is adjacent to said pole tip on said buzzer plate whereby when said winding is energized said hammer is vibrated with respect to said pole tip.

9. A combined electric motor and buzzer construction comprising, in combination, a magnetic core, a winding on said core, a basket type field structure extending from the ends of said core and surrounding said winding and providing a magnetic field along an annular path coaxial with said core, a shaft rotatably mounted on said core, a rotor carried by said shaft in said path whereby said rotor is caused to rotate, a resilient buzzer arm rigidly fastened at one end and extending over said field structure, and a magnetic hammer carried by said buzzer arm and extending radially through said basket type field structure parallel to the plane of rotation of said rotor and closely adjacent to but spaced from a portion of said field structure so that, when said winding is energized with alternating current, said hammer is vibrated into and out of engagement with said part of said field structure and thereby provides a buzzer action.

10. A combined electric motor and buzzer construction comprising, in combination, a magnetic core, a winding on said core, a basket type field structure extending from the ends of said core and surrounding said winding and providing a magnetic field along an annular path coaxial with said core when said winding is energized with alternating current, one set of adjacent pairs of pole tips from said field structure being omitted whereby a space extending radially outwardly from said core is provided, a shaft rotatably mounted on said magnetic core, a rotor carried by said shaft including a rotor ring of magnetic material extending into the shifting magnetic field and rotated thereby, a buzzer plate on one end of said core having a pole tip overlying said winding and extending transversely of said radial space, a resilient buzzer arm rigidly fastened at one end and extending over said field structure, and a hammer of magnetic material carried by said buzzer arm and extending into said radial space so that its inner end is adjacent to said pole tip on said buzzer plate whereby when said winding is energized said hammer is vibrated with respect to said pole tip.

References Cited in the file of this patent

UNITED STATES PATENTS

| Number | Name | Date |
| --- | --- | --- |
| 2,028,465 | Middleton | Jan. 21, 1936 |
| 2,069,622 | Perlman | Feb. 2, 1937 |
| 2,265,066 | Devaux | Dec. 2, 1941 |
| 2,323,803 | Dickten et al. | July 6, 1943 |
| 2,417,254 | Kelly | Mar. 11, 1947 |